United States Patent [19]

Oswald et al.

[11] Patent Number: 5,389,460
[45] Date of Patent: Feb. 14, 1995

[54] VIBRATION-RESISTANT BATTERY HAVING INDIVIDUALLY SUPPORTED STORAGE CELLS

[75] Inventors: Walter R. Oswald, Huntington Beach; Steven J. Stadnick, Lakewood; Allen R. Powers, Venice; David W. Wong, Torrance, all of Calif.

[73] Assignee: Hughes Aircraft Company, Los Angeles, Calif.

[21] Appl. No.: 221,335

[22] Filed: Mar. 31, 1994

[51] Int. Cl.[6] .................. H01M 2/10; H01M 10/34
[52] U.S. Cl. .................................... 429/101; 429/186
[58] Field of Search ............... 429/101, 186, 208, 96

[56] References Cited

U.S. PATENT DOCUMENTS

| | | | |
|---|---|---|---|
| 4,546,054 | 10/1985 | Carr et al. | 429/101 |
| 4,820,597 | 4/1989 | Lim et al. | 429/101 X |
| 4,950,564 | 8/1990 | Puglisi et al. | 429/101 |
| 5,208,118 | 5/1993 | Richardson | 429/101 |

*Primary Examiner*—Anthony Skapars
*Attorney, Agent, or Firm*—Elizabeth E. Leitereg; Terje Gudmestad; W. K. Denson-Low

[57] ABSTRACT

A battery (20) includes a battery container (22), a base (30) attached to the interior of the wall (24) of the battery container (22), a compliant first weld ring (32) extending to a first side of the base (30), and a compliant second weld ring (34) extending to a second side of the base (30). A first electrochemical storage cell stack (36) is supported on a core (42) extending from the first weld ring (32), and a second electrochemical storage cell stack (38) is supported on a separate core (42) extending from the second weld ring (34). Each of the storage cell stacks (36,38) includes a set of storage cells (40) and a gas screen (68) between each of the storage cells (40). The gas screens (68) are dimensioned to extend outwardly to contact the wall (24) of the battery container (22), thereby serving to damp vibrations in the storage cell stack (36, 38).

19 Claims, 2 Drawing Sheets

VIBRATION-RESISTANT BATTERY HAVING INDIVIDUALLY SUPPORTED STORAGE CELLS

BACKGROUND OF THE INVENTION

This invention relates to a battery having a plurality of electrical storage cells, and, more particularly, to such a battery having improved mechanical stability against vibrations.

Rechargeable cells o r batteries are electrochemical devices for storing and retaining an electrical charge and later delivering that charge as useful power. A familiar example of the rechargeable cell is the nickel-cadmium cell used in various portable electronic devices such as cameras and radios. Another type of cell having a greater storage capacity for it s weight is the nickel-hydrogen cell. The nickel-hydrogen cell is used in spacecraft such as satellites to store power generated by solar cell s when the spacecraft is in sunlight, and discharged to supply power when the spacecraft is in darkness.

A battery of this type has a plurality of individual electrochemical storage cells. Each of the storage cells utilizes a nickel positive electrode, a negative electrode, and an electrolyte as the basic charge-storing element. For example, the nickel-hydrogen battery includes a series of active storage cells, each storage cell having a nickel/nickel oxide positive electrode (termed a "nickel electrode"), a hydrogen negative electrode, a separator between the electrodes, and an electrolyte such as a potassium hydroxide solution. A stack of the storage cells is packaged within a pressure vessel that contains the stack, the electrolyte, the hydrogen gas evolved and consumed during the charge/discharge cycle of the cell, and gas screens between the storage cells to permit the hydrogen gas to flow to and from the electrodes.

The stacked configuration of storage cells is subjected to external loads or shocks during launch of a spacecraft containing the battery. The stack has a natural vibration frequency that may be excited by these loadings. If the vibrations are sufficiently severe, the battery may be damaged and rendered partially or fully inoperable.

Various design approaches have been utilized that could minimize the possibility that a battery can be damaged. The battery may be reinforced to resist loadings, but such reinforcement adds weight to the battery that reduces its specific storage performance. In another approach, the battery stack has been divided in half, and the two half stacks are separately supported from a central support within the battery container. The present inventors have recognized that this suggested design has drawbacks, however, because the two half stacks are dynamically coupled and supported in a cantilevered fashion that may readily vibrate. Dissipation of thermal energy is also inefficient in this approach.

There s a need for an improved battery design to resist vibration-induced damage. The present invention fulfills this need, and further provides related advantages.

SUMMARY OF THE INVENTION

The present invention provides a battery configured to minimize vibration-induced damage. In this approach, the capacity of the battery can be increased without a significant increase in weight. A typical nickel-hydrogen battery utilizing the present design has a capacity of 160–250 Ah (ampere-hours), as compared with a conventional battery of similar size and weight having a capacity of 110–160 Ah. The approach of the invention is fully compatible with other battery improvements.

In accordance with the invention, a battery comprises a battery container having a battery wall. A base is attached to the interior of the battery wall. A compliant first support extends from a first side of the base, and a compliant second support extends from a second side of the base. A first electrochemical storage cell stack is supported from the first support, and a second electrochemical storage cell stack is supported from the second support. This design effectively decouples the vibrational movements of the two storage cell stacks, increasing the vibrational frequency of each of the stacks to a value above that encountered in typical situations resulting from aerodynamic loadings on the vehicle carrying the battery.

In a further aspect, each of the storage cell stacks comprises storage cell means for electrolytically storing energy, with at least some portion of the storage cell means extending to the battery wall to form a mechanical contact therewith. The contact between the storage cell means and the battery wall further damps vibrations that may otherwise cause damage in the cell stack.

In the preferred approach, each of the cell stacks comprises a plurality of individual electrolytic storage cells. Each storage cell includes an annular anode, an annular cathode, and an annular separator containing an electrolyte between the anode and the cathode. An annular gas screen is placed between each of the individual storage cells, and it is the gas screen that has a diametral such that it contacts the battery wall. Each cell stack s supported by a cantilevered support core extending through the centers of the individual storage cells from the support. Each cell stack further includes means for retaining the individual storage cells on the support core, and means for making electrical contact to the storage cells.

The present invention provides a battery that is particularly resistant to vibration-induced and shock-induced damage, without substantially increasing the weigh t of the battery. Other features and advantage s of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
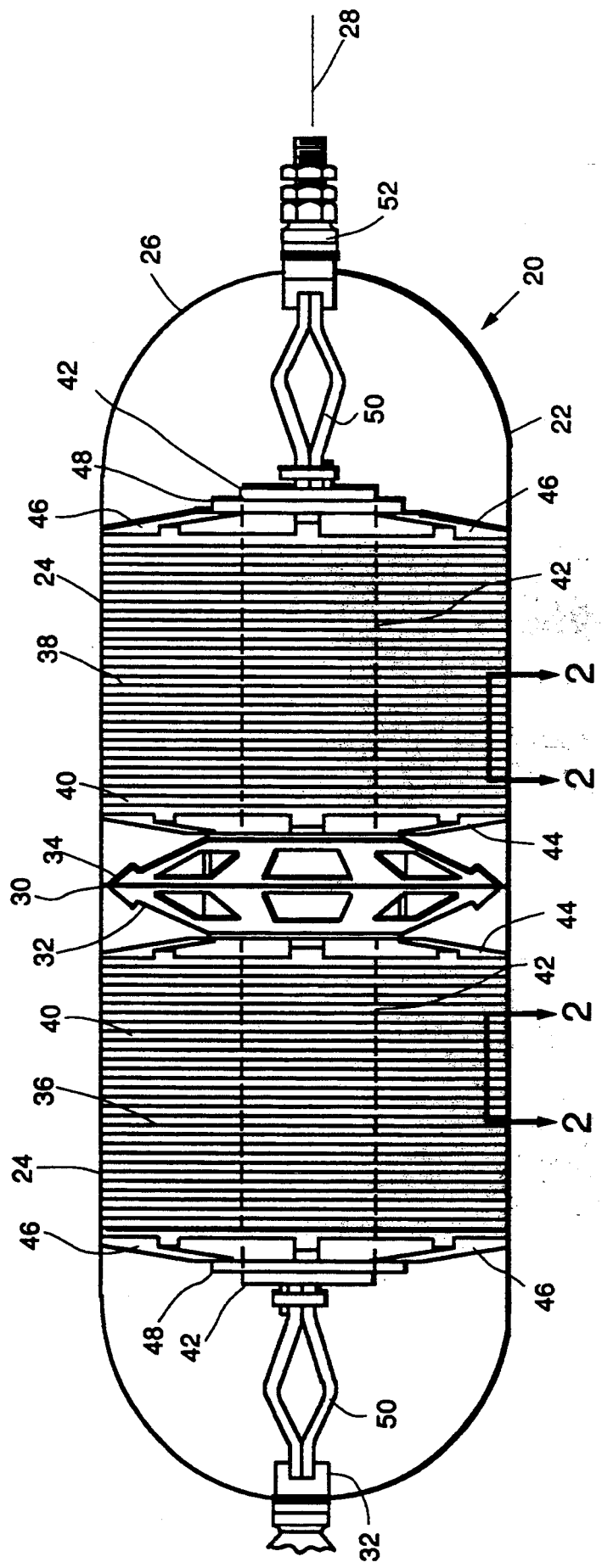
FIG. 1 is a schematic side sectional view of a battery in accordance with the invention.
Figure 2:
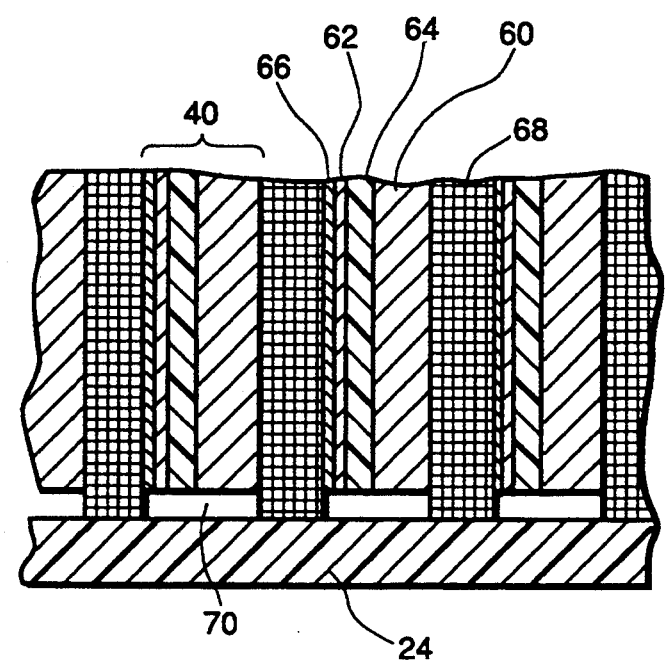
FIG. 2 is an enlarged schematic sectional view of a detail of FIG. 1, taken generally on line 2—2, illustrating the individual storage cell construction and the arrangement of the gas screen.

The present invention is preferably used in conjunction with a pressurized gas-metal battery such as a nickel-hydrogen battery 20 illustrated in FIGS. 1 and 2. The battery 20 comprises a battery container 22 having a battery wall 24 with domed ends 26. In the preferred version, the battery wall 24 is cylindrical with a container axis 28 coincident with the cylindrical axis. For the pressurized gas-metal battery, the container 22 is a pressure vessel manufactured of a material such as Inconel 718 nickel-based alloy which can withstand internal pressures on the order of 1,000 psi, without damage by hydrogen embrittlement or corrosion by the electrolyte.

A base 80 is attached to the interior of the battery wall 24 at a location intermediate between the ends of the container 22. Preferably, the base is attached to the interior of the battery wall 24 by welding equidistant from the ends of the container 22, when measured along the container axis 28. The base 30 is an annulus supported at the weld joint between two halves of the container 22 that are joined together during fabrication of the battery 20.

A first weld ring 32 and a second weld ring 34 are attached to the opposite sides of the base 30. The first weld ring 82 extends to the left in FIG. 1, and the second weld ring 84 extends to the right in FIG. 1. Each weld ring is a cylindrically symmetric webbed structure having structural strength but also having a degree of compliance. The loads of the individual cell stacks are carried by the compliant weld rings and the base to the battery wall 24. The compliant structure of the weld rings and their mode of support effectively decouples the vibrations of the attached cell stacks from each other.

Attached to each of the weld rings 32 and 34 is an electrolytic storage cell stack, its supports, and its electrical connections. A first storage cell stack 36 extends to the left In FIG. 1 from the first weld ring 32, and a second storage cell stack 38 extends to the right in FIG. 1 from the second weld ring 34. The storage cell stacks 36 and 38 are otherwise identical in construction, and the following discussion applies to both of the storage cell stacks 36 and 38.

Each storage cell stack 36, 38 includes a plurality of individual storage cells 40. Each of the storage cells 40 is formed of an arrangement of annular elements supported on a support core 42 that is fixed to the weld ring 32, 34. An annular compression end plate is positioned at each end of each of the cell stacks 36, 38. An inner compression end plate 44 is adjacent to the respective weld ring 32, 34, and an outer compression end plate 46 is remote from the respective weld ring 32, 34.

Each storage cell stack 36, 38 is placed under a longitudinal compressive pressure of, for example, about 10 pounds per square inch, by tightening the compression plates 44, 46 against each end of the storage cell stack 36, 38. The tightening of the compression plates 44, 46 is preferably accomplished by individually compressing the storage cell stacks 36, 38 and then tightening a nut on threads on the support core 42. A Belleville washer set 48 is thereby compressed against the outer compression plate 46 to retain the cell stack 36, 38 In compression on the support core 42.

Electrical connection to the storage cells 40 is made with a conventional electrical lead set 50 extending from the exterior of the battery 20 to each of the storage cell stacks 36, 38. Each lead set 50 utilizes a hermetic feedthrough 52 in the respective domed end 26 of the battery container 22. The lead sets 50 include a plurality of individual leads that are connected to the electrodes of the storage cells 40 in a manner determined for each storage cell 40 in order to provide the required voltage and current for a selected application. It is not necessary that the two storage cell stacks 36 and 38 be electrically connected in exactly the same manner.

In this design, each of the cell stacks 36 and 38 is supported from its respective weld ring 32 or 34. The separate weld ring supports serve to isolate the vibrations in the two cell stacks from each other. The result is to shorten the cell stacks, so that each cell stack 36, 38 has a higher vibrational frequency than a longer cell stack of similar storage capacity. This higher vibrational frequency reduces the likelihood that the cell stack can be damaged by externally imposed loadings such as vibrations and shocks occurring during launch of a spacecraft.

To further damp any vibrations, the storage cells 40 are structured in the manner shown in FIG. 2. Each storage cell 40 comprises an anode 60, a cathode 62, and an electrolyte-containing separator 64. The separator 64 physically separates the electrodes 60 and 62, and also supplies the electrolyte medium through which ionic and electron transfer occur.

Various constructions of the electrodes and separators of nickel-hydrogen cells are disclosed in the following U.S. Pat. Nos., whose disclosures are herein incorporated by reference: 4,820,597; 4,283,844; 4,262,061; 4,250,235; 4,000,350; and 3,669,744.

In the preferred design, the anode or nickel electrode 60 is formed by impregnating nickel oxide into a porous sintered substrate, and the complete process will be discussed in greater detail subsequently. The cathode 62 is coated on one side by a sintered mixture of platinum black and polytetrafluoroethylene, and on the other side with a porous layer of polytetrafluoroethylene 66. These layers are applied to a nickel substrate in the form of an etched sheet or a woven mesh, to form the cathode 62. Many different types of separators 64 have been used, including, for example, asbestos, nylon, and a cloth of zirconium oxide-yttrium oxide. The electrolyte, typically a 26–31 percent aqueous solution of potassium hydroxide, is impregnated into the separator 64 in this flight-type cell.

In forming the cell stacks 36 and 38 from these storage cells 40, a monofilament polypropylene gas screen 68 is placed between each storage cell 40. The gas screen 68 permits hydrogen evolved at the cathode 62 during normal charging, and oxygen liberated at the anode 60 during overcharging, to diffuse to the opposite electrode to combine and form water.

Some portion of at least some of the individual storage cells 40 and the gas screens 68 extends to contact the interior of the adjacent battery wall 24. In the preferred case, the gas screen 68 is made of a sufficiently large diametral size to mechanically contact the battery wall 24. The gas screen 68 is chosen in preference to some element of the storage cell 40 for contacting to the battery wall 24, so that no insulation is required (in the case of the anode and cathode) and there is no opportunity for electrolyte to leak away (in the case of the separator). Extension of the gas screen 68 to contact the inside of the battery wall 24 improves its performance by increasing the exposed surface area of the gas screen through which gas can diffuse when necessary and providing a gas diffusion path in a volume 70 between the exterior of the storage cell 40 and the wall 24.

The mechanical contact between the gas screen 68 and the interior of the battery wall 24 is not intended to support a substantial portion of the weight of the storage cell stacks 36 and 38. The primary is support function accomplished by the support cores 42. Instead, the mechanical contact between the tip of the gas screen and the battery wall serves to d amp mechanical vibrations that may be introduced into the storage cell stacks 36 and 38. This contact further reduces the susceptibility of the storage cell stacks 36 and 38 to mechanical damage from externally generated shocks and vibrations. It has been known in the past for gas screens in nickel-hydrogen batteries to touch the container walls, but not in conjunction with the present approach for supporting the storage cell stacks.

By way of illustration, a battery 20 according to the present approach and having the battery container 22 of external dimensions 4½ inches diameter and 17.5 inches long contains two storage cell stacks 36 and 36, with each of the storage cell stacks having a capacity of about 125 Ah (ampere hours). The resulting electrical storage capacity of the battery is about 250 Ah. The battery 20 may be charged and discharged through thousands of cycles without apparent physical damage to the components, if the charging and discharging are accomplished properly.

Charging is accomplished by passing a dc current through the lead sets 50 across each storage cell 40 so that electrons flow from the cathode 62 to the anode 60. Electrical energy is thereby stored in each plate set in the form of chemical reactants, for subsequent discharging to produce a usable current. A nickel-hydrogen cell of the type described previously may be fully charged by a solar cell array to a capacity of, for example, about 250 Ah, using a current of about 25 amperes at 1.55 volts, through a charging period of about 16 hours from a discharged state. The voltage and charging time vary, depending upon the power available from the solar cell and the cycle dictated by the orbit of the spacecraft.

The battery 20 is also resistant to externally induced shocks and vibrations by virtue of having a higher vibrational natural frequency than conventional batteries of comparable storage. To test this point, two batteries having 200 Ah storage capacity were constructed. One had a conventional single-stack configuration and the other had the dual-stack configuration according to the present invention. The vibrational natural frequencies of the two batteries were measured. The conventional battery had a vibrational natural frequency of about 210 Hertz (cycles per second), and the battery of the present invention had a vibrational natural frequency of about 290 Hertz. The battery of the present invention would be more resistant to vibrational damage during spacecraft launch than a conventional battery.

Although a particular embodiment of the invention has been described in derail for purposes of illustration, various modifications and enhancements may be made without departing from the spirit and scope of the invention. Accordingly, the invention is not to be limited except as by the appended claims.

What is claimed is:

1. A battery, comprising:
a battery container, comprising:
a battery wall having oppositely disposed battery ends, and
stack support means for supporting internal structure within the battery wall, the stack support means being supported from the battery wall at a location between the battery ends and including means for vibrationally decoupling loads supported on the stack support means;
a first cell stack supported from a first side of the stack support means and extending in a first direction therefrom; and
a second cell stack supported from a second side of the stack support means and extending in a second direction therefrom, opposite to the first direction, each of the first cell stack and the second cell stack comprising
storage cell means for electrolytically storing energy, at least some portion of the storage cell means extending to the battery wall to form a mechanical contact therewith,
means for supporting the storage cell means from the stack support, and
means for making electrical contact to the storage cell means.

2. The battery of claim 1, wherein the stack support means is supported from the battery wall at a location about equidistant from the ends of the battery wall along the container axis.

3. The battery of claim 1, wherein the storage cell means includes a plurality of individual electrochemical storage cells.

4. The battery of claim 3, wherein each storage cell includes an annular anode, an annular cathode, and an annular separator containing an electrolyte between the anode and the cathode.

5. The battery of claim 3, further including an intermediate component between each of the storage cells, and wherein the intermediate component is an annular gas screen having a size such that it contacts the battery wall.

6. The battery of claim 3, wherein the means for supporting the storage cell means comprises
a support core extending through an annular center opening of each of the individual storage cells, and
means for retaining the individual storage cells on the support core.

7. The battery of claim 1, wherein the battery wall is cylindrical with domed ends.

8. The battery of claim 1, wherein the storage cell means includes a nickel-hydrogen storage cell.

9. The battery of claim 1, wherein the means for vibrationally decoupling includes a compliant support for each of the cell stacks, with each cell stack being supported on its own compliant support.

10. The battery of claim 9, wherein each compliant support comprises a webbed structure.

11. The battery of claim, wherein each of the compliant supports is cylindrically symmetric.

12. The battery of claim 1, wherein the stack support means includes
a base attached to the interior of the battery wall,
a compliant first weld ring extending to the first side of the base, the first cell stack being supported from the first weld ring, and
a compliant second weld ring extending to the second side of the base, the second cell stack being supported from the second weld ring.

13. The battery of claim 12, wherein each weld ring comprises a cylindrically symmetric webbed structure.

14. A battery, comprising:
a battery container comprising a battery wall having a first end and a second end;
a base fixed to an interior of the battery wall at a location between the ends of the battery wall;
a first compliant support attached to a first side of the base;
a second compliant support attached to a second side of the base;

a first cell stack supported from the first compliant support and extending in a first direction therefrom; and a second cell stack supported from the second compliant support and extending in a second direction therefrom, each of the first cell stack and the second cell stack comprising a plurality of individual electrolytic storage cells, each storage cell including an annular anode, an annular cathode, and a separator containing an electrolyte between the anode and the cathode, a gas screen placed between each of the individual storage cells, the gas screen having a diametral size such that it contacts the battery wall, and means for making electrical contact to the storage cells.

15. The battery of claim 14, wherein each of the cell stacks further comprises a support core extending through the centers of the Individual storage cells, and means for retaining the individual storage cells on the support core.

16. The battery of claim 14, wherein the battery wall is cylindrical.

17. A battery, comprising:

a battery container having a battery wall;

a base attached to the interior of the battery wall;

a compliant first support extending from a first side of the base;

a compliant second support extending from a second side of the base;

a first electrochemical storage cell stack supported from the first support; and a second electrochemical storage cell stack supported from the second support.

18. The battery of claim 17, wherein each of the first storage cell stack and the second storage cell stack comprises storage cell means for electrolytically storing energy, at least some portion of the storage cell means extending to the battery wall to form a mechanical contact therewith, means for supporting the storage cell means from the respective compliant support, and means for making electrical contact to the storage cell means.

19. The battery of claim 17, wherein each compliant support comprises a cylindrically symmetric webbed structure.

* * * * *